(12) United States Patent
Hata

(10) Patent No.: US 7,079,204 B2
(45) Date of Patent: Jul. 18, 2006

(54) LAMINATED OPTICAL FILM, ELLIPTICALLY POLARIZING PLATE, AND IMAGE VIEWING DISPLAY

(75) Inventor: Masahiro Hata, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 79 days.

(21) Appl. No.: 10/863,394

(22) Filed: Jun. 9, 2004

(65) Prior Publication Data

US 2004/0263731 A1 Dec. 30, 2004

(30) Foreign Application Priority Data

Jun. 16, 2003 (JP) .............................. 2003-170534
Feb. 6, 2004 (JP) .............................. 2004-030937

(51) Int. Cl.
G02F 1/1335 (2006.01)

(52) U.S. Cl. ......................................... 349/101; 349/96

(58) Field of Classification Search .................. 349/96, 349/98, 99, 101
See application file for complete search history.

(56) References Cited

U.S. PATENT DOCUMENTS

| | | | |
|---|---|---|---|
| 5,730,899 A * | 3/1998 | Ohnishi et al. | 252/299.01 |
| 6,417,904 B1 | 7/2002 | Yamaoka et al. | 349/117 |
| 6,667,835 B1 | 12/2003 | Yano et al. | |
| 6,795,246 B1 | 9/2004 | Yano et al. | |
| 6,839,103 B1 * | 1/2005 | Kelly et al. | 349/98 |

FOREIGN PATENT DOCUMENTS

| | | |
|---|---|---|
| EP | 0587890 A | 3/1994 |
| EP | 1300701 A | 4/2003 |
| JP | 5-100114 | 4/1993 |
| JP | 5-157911 | 6/1993 |
| JP | 10-68816 | 3/1998 |
| JP | 10-90521 | 4/1998 |
| JP | 2000-56131 | 2/2000 |
| JP | 2002-0077662 | 10/2002 |
| JP | 2003-29038 A | 1/2003 |
| WO | WO 02/088784 | 11/2002 |

OTHER PUBLICATIONS

Korean Office Action dated Feb. 21, 2006 Corresponding Korean Patent Application No. 10-2004-0044661.

* cited by examiner

Primary Examiner—Dung T. Nguyen
Assistant Examiner—David Chung
(74) Attorney, Agent, or Firm—Westerman, Hattori, Daniels & Adrian LLP

(57) ABSTRACT

A laminated optical film comprising an optical film (1) obtained by stretching a polymer film comprising a polycarbonate resin and a styrene resin, wherein a photoelastic coefficient is $2.0 \times 10^{-11}$ to $6.0 \times 10^{-11}$ m$^2$/N, and a three dimensional refractive index is controlled, an optical film (2) showing optically positive uniaxial property that satisfies a relationship of $nx_2 > ny_2 \cong nz_2$, and an optical film (3) formed of a material showing optically negative uniaxial property, and the material being tilting aligned, enables inhibition of coloring of display image for observation of a display picture in a diagonal direction to normal line of a screen, and enables display of an image having little gradation inversion areas, and that has outstanding durability.

14 Claims, 2 Drawing Sheets

LAMINATED OPTICAL FILM, ELLIPTICALLY POLARIZING PLATE, AND IMAGE VIEWING DISPLAY

BACKGROUND OF THE INVENTION

1. Field of the Invention

The present invention relates to a laminated optical film. An optical film of the present invention may be used independently or may be used in combination with other optical films as various optical films, such as retardation films, viewing angle compensation films, optical compensation films, elliptically polarizing plates (including circularly polarizing plates), and brightness enhancement films. A laminated optical film of the present invention is especially useful when it is laminated with polarizing plates to be used as elliptically polarizing plates.

In addition, the present invention relates to an image viewing display such as a liquid crystal display, an organic EL (electroluminescence) viewing display, a PDP using the laminated optical film, the elliptically polarizing plate, and the like. A laminated optical film and an elliptically polarizing plate of the present invention may be applied for various liquid crystal displays etc. as described above, and may be especially suitably used for reflective and transflective type liquid crystal display that can be mounted in portable information and telecommunications instruments, personal computers, etc. It is also suitable for mounting to liquid crystal displays in TN (Twisted nematic) mode, OCB (Optically compensated bend), and homogeneous mode as liquid crystal displays.

2. Description of the Related Art

Conventionally, many optical films comprising various kinds of polymer materials have been used for the purpose of improving picture-quality in image viewing displays, such as portable information and telecommunications instruments, liquid crystal monitors, liquid crystal televisions, organic EL viewing displays. For example, performing stretching process for polymer films having birefringence produces such optical films. Among them when a direction wherein refractive indexes of refraction in a film plane gives a maximum is defined as an X-axis, a direction perpendicular to the X-axis is defined as a Y-axis, a thickness direction of a film is defined as a Z-axis, and refractive indexes in each axial direction are defined as nx, ny, nz, respectively, an optical film wherein a Nz coefficient expressed in a formula of (nx−nz)/(nx−ny) is controlled may preferably be used in order to widen a viewing angle of image viewing displays, such as the above-mentioned liquid crystal displays.

An Nz coefficient preferable for optical films depends upon modes (TN, VA, OCB, IPS modes, etc.) of the liquid crystal displays. Therefore, in order to obtain optical films having a required Nz coefficient polymer materials having superior film workability and birefringence that may easily be controlled into a desired Nz coefficient are suitably selected for use. For example, since optical films satisfying a relationship of Nz coefficient $\leq 0.9$ may control indexes of refraction to be at least nz>ny, polymer materials having such indexes of refraction and developing birefringence are suitably used.

Since optical films satisfying Nz coefficient $\leq 0.9$ may advantageously developing superior birefringence, for example, they may be obtained by stretching polycarbonate resin films including a unit of 2,2-bis (4-hydroxyphenyl) propane as polymer films (See Japanese Patent Laid-Open No. 5-157911 official report). The polycarbonate resins are preferable from a viewpoint of having high transparency and moderate heat resistance. However, optical films obtained by stretching of polycarbonate resin films have a large birefringence change when stress is applied; that is, they have a large photoelastic coefficient. Therefore, there occurs a problem that the optical films easily cause a large degree of unevenness when they are adhered to polarizing plates. Moreover, in recent years, upsizing of liquid crystal panels, such as in liquid crystal televisions, increases stress that works on panels, and therefore optical film materials having smaller change of retardation (change of birefringence) is increasingly required. Moreover, the optical films have such problems that exhibit large retardation variation, under use environment after adhered onto viewing displays. Since they had this problem, the optical films were not suitable for application in recent years wherein high heat resistance, and high temperature and high moisture resistance were required.

On the other hand, as polymer materials having a comparatively small photoelastic coefficient, for example, norbornene resins are known (See Japanese Patent Laid-Open No. 2000-56131 official report). However, although the norbornene resins have a small photoelastic coefficient, they simultaneously show a characteristic to have a small birefringence, providing a limitation to retardation given by stretching process. Especially, control of three dimensional refractive index satisfying a relationship of Nz coefficient $\leq 0.9$ is difficult.

Conventionally, broadband retardation plates are suitably used that have functions as a quarter wavelength plate or a half wavelength plate with respect to incident light with wavelength area of broadband (visible light range) for reflective and transflective type liquid crystal displays etc. As this broadband retardation plates, laminated films obtained by laminating two or more polymer films having optical anisotropy in a state of optical axes being intersected with each other are proposed. In these laminated films, broadband characteristics are realized by making optical axes of two-layered or two or more sheets of stretched films intersect with each other (for example, refer to Japanese Patent Laid-Open Publication No. 5-100114, Japanese Patent Laid-Open Publication No. 10-68816, Japanese Patent Laid-Open Publication No. 10-90521).

However, even when the broadband retardation plates described in the above-mentioned Patent Literatures are used, there is a defect of gradation inversion wherein observation of displayed picture in diagonal (upward, downward, right-hand and left-hand) directions with respect to normal line of a screen varies hue of the displayed picture, or gives inversion between white images and black images.

SUMMARY OF THE INVENTION

The present invention aims at providing an optical film that enables inhibition of coloring of display image for observation of a display picture in a diagonal direction to normal line of a screen, and enables display of an image having little gradation inversion areas, and that has outstanding durability.

The present invention also aims at providing an elliptically polarizing plate laminating the optical film and a polarizing plate.

Furthermore, the present invention aims at providing an image viewing display using the optical film or the elliptically polarizing plate.

As a result of wholehearted research made by the present inventors in order to solve the above-mentioned problems, it was found out that the object might be attained using a following laminated optical film, thus leading to completion of the present invention.

That is, the present invention relates to a laminated optical film comprising:

an optical film (1) obtained by stretching a polymer film comprising a polycarbonate resin and a styrene resin, wherein a photoelastic coefficient is $2.0 \times 10^{-11}$ to $6.0 \times 10^{-11}$ m$^2$/N, and a three dimensional refractive index is controlled so that an Nz coefficient expressed with $Nz=(nx_1-nz_1)/(nx_1-ny_1)$ may satisfy a relationship of $Nz \leq 0.9$, and a front retardation $(Re)=(nx_1-ny_1) \times d_1$ may satisfy a relationship of $Re \geq 80$ nm, when a direction where a refractive index in a film plane gives a maximum is defined as X-axis, a direction perpendicular to the X-axis as Y-axis, a thickness direction of the film as Z-axis, and when refractive indexes in each axial direction are defined as $nx_1$, $ny_1$, and $nz_1$, respectively, and a thickness of the film as $d_1$ (nm);

an optical film (2) showing optically positive uniaxial property that satisfies a relationship of $nx_2 > ny_2 \cong nz_2$, when a direction where a refractive index in a film plane gives a maximum is defined as X-axis, a direction perpendicular to X-axis as Y-axis, a thickness direction of the film as Z-axis, and when refractive indexes in each axial direction are defined as $nx_2$, $ny_2$, and $nz_2$, respectively; and an optical film (3) formed of a material showing optically negative uniaxial property, and the material being tilting aligned.

A laminated optical film of the present invention is obtained by laminating the optical film (1) having a controlled three dimensional refractive index, the optical film (2) showing optically positive uniaxial property and the Optical film (3) in which a material showing optically negative uniaxial property is tilting aligned, which is useful as a broadband retardation film enabling compensation of wide viewing angles. Image viewing displays in which the laminated optical films are applied, such as liquid crystal displays, enable realization of wide viewing angle, and also enable controlled display coloring and image having little gradation inversion area for observation in diagonal directions with respect to display screens.

The optical film (1) uses polymer films including styrene resins in addition to polycarbonate resins. Blending of the styrene resins enables control of a photoelastic coefficient of optical film within a range of $2.0 \times 10^{-11}$ to $6.0 \times 10^{-11}$ m$^2$/N, leading to excellent durability. Therefore, when the optical film concerned is applied to large-sized panels, it may give little change of retardation values under stress-applied conditions, and it may suitably be used also in application, for example, requiring high heat resistance, and high temperature and high moisture resistance. The photoelastic coefficient is preferably $3.0 \times 10^{-11}$ to $5.0 \times 10^{-11}$ m$^2$/N. A photoelastic coefficient exceeding $6.0 \times 10^{-11}$ m$^2$/N gives insufficient durability, and also large retardation change under stress-applied conditions. On the other hand, the photoelastic coefficient of less than $2.0 \times 10^{-11}$ m$^2$/N gives inferior processability in stretching, and disadvantageously makes control of an Nz coefficient difficult. Moreover, since the optical films have polycarbonate resins as a principal component, it has excellent expression and controllability of birefringence based on polycarbonate resins. And, polycarbonate resins and styrene resins have excellent mutual compatibility, giving high transparency to the resulting optical film.

In the optical film (1), an Nz coefficient defined above satisfies a relationship of $Nz \leq 0.9$, and, as a result, has a wide viewing angle characteristics. An Nz coefficient of $Nz > 0.9$ makes development of a wide viewing angle difficult. A Smaller Nz coefficient is more preferable, and preferably satisfy a relationship of $Nz \leq 0.7$, and more preferably $Nz \leq 0.5$. In addition, in the optical films, a case of $(nx_1-nz_1) < 0$ may be included and an Nz coefficient may have negative values. And in consideration of expansion of viewing angles in four (upward, downward, right-hand and left-hand) directions, an Nz coefficient is controlled −1 or more, and preferably −0.5 or more.

Moreover, since a change of front retardation is small, the front retardation (Re) of the optical film (1) satisfies also a relationship of $Re \geq 80$ nm. An Re satisfying a relationship of $Re < 80$ nm gives greater change in front retardation. Therefore, the Re satisfies a relationship of $Re \geq 90$ nm, and preferably $Re \geq 100$ nm. However, in order to acquire smaller change of the thickness direction retardation, it is preferably $Re \leq 300$ nm. Moreover, retardation in a thickness direction: $(nx-nz) \times d$ is preferably −300 to 300 nm, and more preferably 0 to 270 nm.

In the laminated optical film, a weight average molecular weight of the styrene resins that is materials of the optical film (1) is preferably 20,000 or less. Besides, a glass transition temperature of the optical film (1) is preferably in a range of 110 to 180° C.

Moreover, in the laminated optical films, a film obtained by stretching polymer films including norbornene polymers may be used as the optical film (2). As the optical film (2), an optical film may be used that is obtained by stretching polymer films including polycarbonate resins and styrene resins, that is same materials as of the optical film (1) having a photoelastic coefficient of $0.5 \times 10^{-11}$ to $6.0 \times 10^{-11}$ m$^2$/N, and preferably of $1.0 \times 10^{-11}$ to $6.0 \times 10^{-11}$ m$^2$/N. The optical film (2) using these materials has excellent durability.

Materials showing optically negative uniaxial property forming the optical film (3), in the laminated optical film, it is preferable that the materials are of discotic liquid crystal compounds. Although materials showing optically negative uniaxial property are not especially limited, discotic liquid crystal compounds are suitable, in consideration of easiness of control of tilted alignment and of comparatively common material with a low cost.

Moreover, in the laminated optical film, materials showing optically negative uniaxial property that forms the optical film (3) are preferably given tilted orientation so that an average optical axis and a normal line of the optical film (3) may make tilt angles in a range of 5° to 50°.

As mentioned above, the optical film (3) is used as a laminated optical film combined with the optical film (1) having a controlled three dimensional refractive index, and controlling of the inclining angle of the optical film (3) to 5° or more can provide large viewing angle expansion effect when mounted in liquid crystal displays etc. On the other hand, controlling of the tilt angle to 50° or less may provide excellent viewing angles in any of four (upward, downward, right-hand and left-hand) directions, and thereby change of viewing angle quality depending on viewing directions can be suppressed. Based on such reasons, the tilt angle is preferably in a range of 10°–30°.

In addition, the optical material showing optically negative uniaxial property (for example, discotic liquid crystalline molecule) may be in a state of uniform tilted alignment where alignment may not vary in connection with a distance from a film plane, or may vary in connection with a distance between the optical material and a film plane.

In the laminated optical film, a configuration wherein the optical film (1) having a controlled three dimensional refractive index is disposed between the optical film (2) showing optically positive uniaxial property and the Optical film (3) in which a material showing optically negative uniaxial property is tilting aligned, can realize a wide viewing angle, which is preferable in order to suppress more effectively gradation inversion areas when observed from diagonal directions.

Moreover, the present invention relates to an elliptically polarizing plate comprising the laminated optical film and a polarizing plate. As the elliptically polarizing plate, a film is preferable that has a polarizing plate laminated on the optical film (2) side thereof, from viewpoint point of realization of a wide viewing angle and improvement in gradation inversion area when observed in diagonal directions.

Furthermore, the present invention relates to an image viewing display comprising the laminated optical film or the elliptically polarizing plate. As image viewing displays, it may suitably be applied to liquid crystal displays in TN mode, OCB, and homogeneous mode.

DESCRIPTION OF THE PREFERRED EXAMPLES

Figure 1:
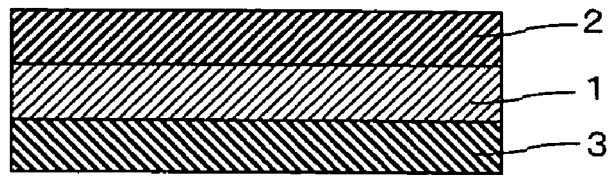
FIG. 1 is one embodiment of a sectional view of a laminated type optical film of the present invention.
Figure 2:
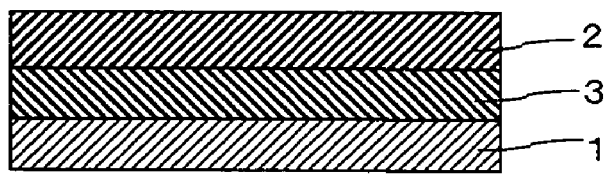
FIG. 2 is one embodiment of a sectional view of a laminated type optical film of the present invention.
Figure 3:
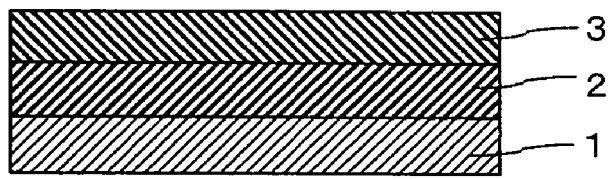
FIG. 3 is one embodiment of a sectional view of a laminated type optical film of the present invention.

Laminated optical film of the present invention will, hereinafter, be described with reference to Figures. As shown in FIG. 1 to 3, an optical film (1) having a controlled three dimensional refractive index, an optical film (2) showing optically positive uniaxial property, and an Optical film (3) in which a material showing optically negative uniaxial property is tilting aligned are laminated together in a laminated optical film of the present invention. An order of lamination of these optical films is not especially limited. In FIG. 1, optical films are laminated in an order of optical film (2)/optical film (1)/optical film (3); in FIG. 2, in an order of optical film (2)/optical film (3)/optical film (1); and in FIG. 3, in order of optical film (3)/optical film (2)/optical film (1), respectively. Above all, an arrangement of lamination as shown in FIG. 2 is preferable.

Figure 4:
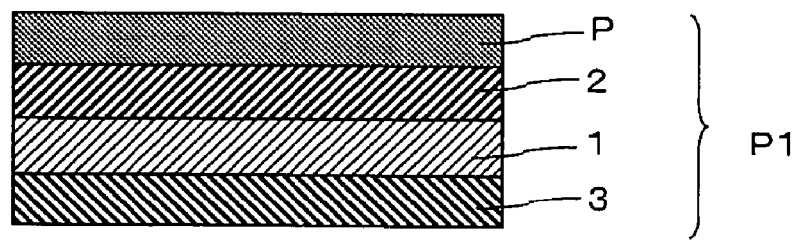
FIG. 4 is one embodiment of a sectional view of an elliptically polarizing plate of the present invention.
Figure 5:
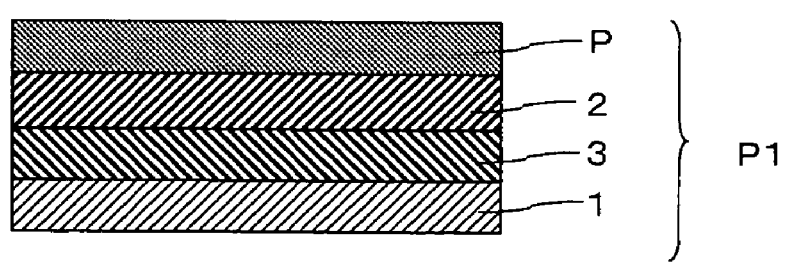
FIG. 5 is one embodiment of a sectional view of an elliptically polarizing plate of the present invention.
Figure 6:
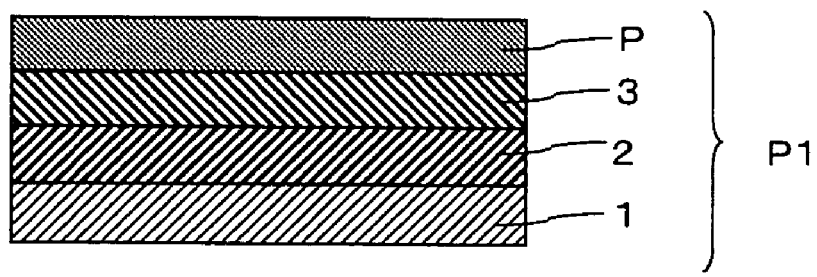
FIG. 6 is one embodiment of a sectional view of an elliptically polarizing plate of the present invention.

Moreover, a polarizing plate (P) may be laminated on the laminated optical film to obtain an elliptically polarizing plate. In FIG. 4 to FIG. 6, elliptically polarizing plates (P1) were shown a polarizing plate (P) laminated on the laminated optical films shown in FIG. 1 to FIG. 3. In addition, a position of lamination of the polarizing plate (P) to the laminated optical film is not especially limited, as shown in FIG. 4 to FIG. 5, the polarizing plate (P) is preferably laminated on a side of the optical film (2) so that a larger viewing angle may be obtained when mounted to a liquid crystal display. Especially, a case of FIG. 4 is preferable.

In addition, in FIG. 1 to FIG. 6, each optical film and polarizing plate may be laminated through pressure sensitive adhesive layers. A number of pressure sensitive adhesive layers used may be one; two or more layers may be superposed.

The optical film (1) is obtained by stretching a polymer film including polycarbonate resins and styrene resins.

Various kinds of polycarbonate resins used for optical films may be used without any special limitation. As polycarbonate resins, for example, aromatic polycarbonates consisting of aromatic series bivalent phenol components and carbonate components are preferable.

As examples of aromatic series bivalent phenolic compounds, there may be used: 2,2-bis(4-hydroxy phenyl)propane, 2,2-bis(4-hydroxy-3,5-dimethyl phenyl)propane, bis (4-hydroxy phenyl)methane, 1,1-bis(4-hydroxy phenyl) ethane, 2,2-bis(4-hydroxy phenyl)butane, 2,2-bis(4-hydroxy-3,5-dimethyl phenyl)butane, 2,2-bis(4-hydroxy-3, 5-dipropyl phenyl)propane, 1,1-bis(4-hydroxy phenyl) cyclohexane, and others. These may be used independently, and two or more kinds may be used in combination. Especially, 2,2-bis(4-hydroxy phenyl)propane, 1,1-bis(4-hydroxy phenyl)cyclohexane, and 1,1-bis(4-hydroxy phenyl)-3,3,5-trimethyl cyclohexane are preferable.

Polycarbonates including a unit of 2,2-bis(4-hydroxy phenyl)propane has outstanding workability, high transparency, and can provide excellent expression of birefringence, and may be used independently. Moreover, in addition to this unit of 2,2-bis(4-hydroxy phenyl)propane, it is preferable that a unit of 1,1-bis(4-hydroxy phenyl)-3,3,5-trimethyl cyclohexane is used together. In using both of them in combination, for example, variation of a percentage to be used can adjust a glass transition temperature (henceforth referred to as Tg) and a photoelastic coefficient of the film. That is, a high content of a component originated in 1,1-bis (4-hydroxy phenyl)-3,3,5-trimethyl cyclohexane in a polycarbonate resin can give a high Tg, and a small photoelastic coefficient. However, since the optical film is obtained by performing stretching process to polymer films, a Tg that is controlled moderately low may give excellent workability. Therefore, a content of a component originated in 1,1-bis (4-hydroxy phenyl)-3,3,5-trimethyl cyclohexane in the polycarbonate resin is preferably 4 times or less in molar ratio with respect to the component originated in 2,2-bis(4-hydroxy phenyl)propane.

In addition, as carbonate components, preferably used are: phosgene, bischloroformate of the bivalent phenols, diphenyl carbonate, di-p-tolyl carbonate, phenyl-p-tolyl carbonate, di-p-chloro phenyl carbonate, dinaphthyl carbonate, etc. Phosgene and diphenyl carbonate are especially preferable.

On the other hand, styrene resins may be obtained by polymerizing styrene based monomers. As styrene based monomers, for example, styrene, α-methylstyrene, 2,4-dimethylstyrene etc. maybe mentioned. These may be independently used, and two or more kinds may be used in combination. Usually, homopolymerized polymer of styrene or polymers using styrene as a principal component and styrene based monomers as combined monomers are used.

Styrene based resins preferably have a weight average molecular weight of 20,000 or less measured by GPC method. A reason is that since a weight average molecular weight exceeding 20,000 worsens compatibility with polycarbonate resins and as a result transparency of the obtained film is reduced, it makes the film unsuitable for optical application requiring transparency. Therefore a weight average molecular weight is preferably 10,000 or less. On the other hand, since an excessively small weight average molecular weight disadvantageously accelerates elution of low molecule components under high temperature and high humidity environment, the weight average molecular weight is preferably 500 or more, and more preferably 1,000 or more.

A ratio of the polycarbonate resins and styrene resins is suitably adjusted so that excellent transparency of the polymer films (optical film) may be obtained and a photoelastic coefficient may be in the above-mentioned range. Usually, when a sum total of polycarbonate resins and styrene resins is 100% by weight, a content of styrene resin is preferably 2 to 50% by weight. A content of less than 2% by weight of the styrene resins makes difficult control of a photoelastic coefficient to a low enough value. Taking such a reason into consideration, a content of the styrene resins is preferably 5% or more by weight, and more preferably 10% or more by weight. On the other hand, a content exceeding 50% by weight disadvantageously reduces a Tg of the polymer films. From this viewpoint, a content of styrene resins is preferably 40% or less by weight, and more preferably 30% or less by weight.

Moreover, taking a fact into consideration that a Tg of a polymer film (optical film) gives influence to heat-resisting property of the film, a higher Tg is preferable. On the other hand, optical films are obtained by stretching polymer films. Since stretching is fundamentally performed under temperature conditions near the Tg, if stretching processability is taken into consideration, a Tg controlled lower is more preferable. From this viewpoint, a Tg of the polymer films (optical films) is preferably 110 to 180° C., more preferably 120 to 170° C., and still more preferably 130 to 160° C.

Stretching process is given to the polymer films comprising polycarbonate resins and styrene resins to produce an optical film wherein a three dimensional refractive index is controlled so that an Nz coefficient satisfies a relationship of Nz≦0.9, and a front retardation (:Re) satisfies a relationship of Re≧80 nm.

Stretching methods are not especially limited, but a method of biaxially stretching a polymer film in a planar direction; and a method of uniaxially or biaxially stretching in a planar direction and stretching also in a thickness direction may be mentioned. And a method or the like may be mentioned in which a heat-shrinkable film is adhered to a polymer film, and then the combined film is stretched and/or shrunk under a condition of being influenced by a shrinking force caused by heat. These methods can control a refractive index in a thickness direction and as a result can control a state of orientation so that a three dimensional refractive index of the stretched film may satisfy relationships of Nz≦0.9 and Re≧80 nm. In addition, a stretching ratio is suitably controlled. In case of uniaxially stretching using a heat-shrinkable film, the stretching ratio is 1.0 to 3.0 times, and preferably 1.0 to 2.0 times. Although a thickness (di) of the optical film obtained by stretching is not especially limited, but it is preferably 1 to 150 μm, and more preferably 5 to 50 μm.

As optical films (2) showing optically positive uniaxial property, films satisfying a relationship of $nx_2 > ny_2 \cong nz_2$ may be used without any limitation, when a direction where a refractive index in a film plane gives maximum is defined as X-axis, a direction perpendicular to the X-axis as Y-axis, a thickness direction of the film as Z-axis, and when refractive indexes in each axial direction are defined as $nx_2$, $ny_2$, and $nz_2$, respectively. A material showing optically positive uniaxial property shows a material having a refractive index in a principal axis in one direction larger than refractive indexes in other two directions in a three dimensional refractive index ellipsoid.

An optical film (2) showing optically positive uniaxial property may be obtained by, for example, uniaxial stretching of a polymer film in a planar direction. As polymers for forming the optical film (2), for example, there may be mentioned: polycarbonate, polyolefines such as polypropylene, polyesters such as polyethylene terephthalate and polyethylene naphthalate, norbornene polymers, polyvinyl alcohols, polyvinyl butyrals, polymethyl vinyl ethers, poly hydroxy ethyl acrylates, hydroxyethyl celluloses, hydroxy propylcelluloses, methyl celluloses, polyallylates, polysulfones, polyethersulfones, polyphenylene sulfides, polyphenylene oxides, polyallyl sulfones, polyvinyl alcohols, polyamides, polyimides, polyvinyl chlorides, cellulose based polymers, such as triacetyl celluloses, acrylic based polymers, styrene based polymers, and various binary and ternary copolymers of the above-mentioned polymers, graft copolymer, blended polymers. Norbornene polymers are preferable among them. Moreover, an optical film is preferable that is obtained by stretching a polymer film including polycarbonate resins and styrene resins of same materials as in the optical film (1) to show a photoelastic coefficient of $0.5 \times 10^{-11}$ to $6.0 \times 10^{-11}$ m²/N.

As materials for forming the optical film (2), rod-like nematic liquid crystalline compounds may also be used. Tilted alignment may be given to the rod-like nematic liquid crystalline compounds. A state of tilted alignment may be controlled by a molecular structure, a kind of alignment layer, and use of additives (for example, plasticizers, binders, surface active agents) suitably added in an optical anisotropy layer.

A front retardation (($nx_2-ny_2) \times d_2$ (thickness: nm)) of the optical film (2) is preferably 0 to 500 nm, and more preferably 1 to 350 nm. A retardation in a thickness direction (($nx_2-nz_2) \times d_2$) is preferably 0 to 500 nm, and more preferably 1 to 350 nm.

Although a thickness ($d_2$) of the optical film (2) is not especially limited, it is preferably 1 to 200 μm, and more preferably 2 to 80 μm.

A material showing optically negative uniaxial property for forming the optical film (3) shows a material having a refractive index in a principal axis in one direction smaller than refractive indexes in other two directions in a three dimensional refractive index ellipsoid.

As materials showing optically negative uniaxial property, for example, liquid crystalline materials, such as polyimide based materials and discotic liquid crystal compounds may be mentioned. Moreover, there may be mentioned films obtained by tilt alignment of the materials, showing optically negative uniaxial property, that include the above-mentioned materials as a principal component and are mixed and reacted with other oligomers or polymers, and by fixing the state. When discotic liquid crystal compounds are used, tilted alignment state of the liquid crystalline molecule may be controlled by a molecular structure thereof, a kind of oriented film, and use of additives (for example, plasticizers, binders, surface active agents) suitably added in an optical anisotropy layer.

A front retardation (($nx_3-ny_3) \times d_3$ (thickness: nm)) of the optical film (3) is preferably 0 to 200 nm, and more preferably 1 to 150 nm, when a direction where a refractive index in a film plane of the optical film (3) gives maximum is defined as X-axis, a direction perpendicular to the X-axis as Y-axis, a thickness direction of the film as Z-axis, and when refractive indexes in each axial direction are defined as $nx_3$, $ny_3$, and $nz_3$, respectively. A retardation in a thickness direction (($nx_3-nz_3$)×$d_3$) is preferably 10 to 400 nm, and more preferably 50 to 300 nm.

Although a thickness ($d_3$) of the optical film (3) is not especially limited, it is preferably 1 to 200 μm, and more preferably 2 to 150 μm.

Lamination of the optical film (1) and the optical film (3) is performed so that a smaller angle made by each slow axis may preferably be 70° to 90°, and more preferably 80° to 90°.

A polarizing plate (P) may be usually used a polarizer with a transparent protective film prepared on one side or both sides of the polarizer. The polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film on which dichromatic materials (iodine, dyes) is absorbed and oriented after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As the transparent protective film prepared on one side or both sides of the polarizer, materials is excellent in transparency, mechanical strength, heat stability, water shielding property, isotropy, etc. may be preferably used. As materials of the above-mentioned protective layer, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. Films made of heat curing type or ultraviolet ray curing type resins, such as acryl based, urethane based, acryl urethane based, epoxy based, and silicone based, etc. may be mentioned.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

In general, a thickness of the protective film, which can be determined arbitrarily, is 10 to 500 μm less in viewpoint of strength, work handling and thin layer, preferably 20 to 300 μm, and especially preferably 30 to 300 μm.

Moreover, it is preferable that the transparent protective film may have as little coloring as possible. Accordingly, a protective film having a retardation value in a film thickness direction represented by Rth=[(nx+ny)/2−nz]×d of −90 nm through +75 nm (where, nx and ny represent principal indices of refraction in a film plane, nz represents refractive index in a film thickness direction, and d represents a film thickness) may be preferably used. Thus, coloring (optical coloring) of polarizing plate resulting from a protective film may mostly be cancelled using a protective film having a retardation value (Rth) of −90 nm through +75 nm in a thickness direction. The retardation value (Rth) in a thickness direction is preferably −80 nm through +60 nm, and especially preferably −70 nm through +45 nm.

As a transparent protective film, if polarization property and durability are taken into consideration, cellulose based polymer, such as triacetyl cellulose, is preferable, and especially triacetyl cellulose film is suitable. In addition, when transparent protective films are provided on both sides of the polarizer, transparent protective films comprising same polymer material may be used on both of a front side and a back side, and transparent protective films comprising different polymer materials etc. may be used. Adhesives are used for adhesion processing of the above described polarizer and the transparent protective film. As adhesives, polyvinyl alcohol derived adhesives, gelatin derived adhesives, vinyl polymers derived latex type, aqueous polyurethane based adhesives, aqueous polyesters derived adhesives, etc. may be mentioned.

A hard coat layer may be prepared, or antireflection processing, processing aiming at sticking prevention, diffusion or anti glare may be performed onto the face on which the polarizing film of the above described transparent protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight part to the transparent resin 100 weight part that forms the fine concavo-convex structure on the surface, and preferably 5 to 25 weight part. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective layer.

As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Proper method may be carried out to attach an adhesive layer to one side or both sides of the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarizing plate top or an optical film top using suitable developing methods, such as flow method and coating method, or a method in which an adhesive layer is once formed on a separator, as mentioned above, and is then transferred on a polarizing plate or an optical film may be mentioned.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

Thickness of an adhesive layer may be suitably determined depending on a purpose of usage or adhesive strength, etc., and generally is 1 to 500 μm, preferably 5 to 200 μm, and more preferably 10 to 100 μm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

The optical film, the elliptically polarizing plate of the present invention may suitably be used in image displays. Especially, it is suitable for liquid crystal displays in TN mode, OCB and homogeneous mode. For example, it may be preferably used for formation of various apparatus, such as liquid crystal displays of reflective transflective type. Reflective transflective type liquid crystal displays etc. may be suitably used as portable information and telecommunications instruments and personal computers. When forming a reflected type transflective type liquid crystal display, an elliptically polarizing plate of this invention is arranged on a backlight of a liquid crystal cell.

Figure 9:
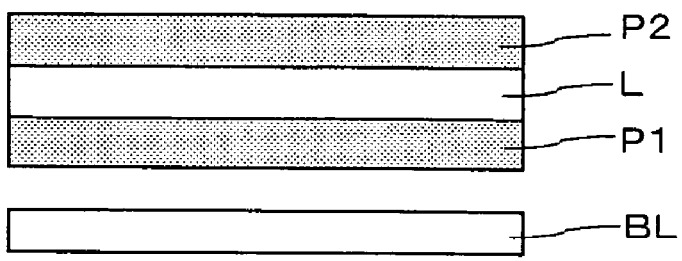
FIG. 9 is a sectional view of an example of a reflective transflective type liquid crystal display of an example.

In FIG. 9, an elliptically polarizing plate (P1) of the present invention shown in FIG. 4 or 6 is arranged via a pressure sensitive adhesive layer, on a side of a backlight (BL) of a liquid crystal cell (L) in a reflective transflective type liquid crystal display. Although an arranged side of an elliptically polarizing plate (P1) being laminated on a lower side (backlight side) of liquid crystal cell (L) is not especially limited, it is preferably arranged so that a polarizing plate (P) of the elliptically polarizing plate (P1) may be most separated from the liquid crystal cell (L) side. Liquid crystal is enclosed within a liquid crystal cell (L). A transparent electrode is provided on an upper liquid crystal cell substrate, and a reflecting layer serving also as an electrode is provided on a lower liquid crystal cell substrate. An elliptically polarizing plate (P2) and various optical films that are used for reflective transflective type liquid crystal displays are arranged on an upper side of liquid crystal cell substrate. The elliptically polarizing plate (P2) may also preferably arrange so that the polarizing plate (P) may be most separated from the liquid crystal cell (L) side.

Besides, when the laminated optical film and the elliptically polarizing plate of the present invention are mounted in a liquid crystal display etc., in the optical film (3), an average optical axis (an average angle of tilted alignment) of a material showing optically negative uniaxial property is preferably arranged so it may face an almost same direction as a direction of alignment of a liquid crystal molecule in a thick direction middle (mid-plane) of a liquid crystal cell, which is aligned by voltage applied from upper side and lower side. In aforesaid case, an alignment of the liquid cell may be twisted type or non-twisted type.

The reflective transflective type liquid crystal display of the FIG. 9 is shown as an example of liquid crystal cells, and, in addition to the example, a laminated optical film and an elliptically polarizing plate of the present invention may be used in various kinds of liquid crystal displays.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

An optical film and an elliptically polarizing plate of the present invention are applied to various kind of liquid crystal displays. The optical film and the elliptically polarizing plate can be laminated with other optical layers. There is especially no limitation about the optical layers, which may be used for formation of a liquid crystal display etc., such as a reflector, a transflective plate, a retardation plate (a half wavelength plate and a quarter wavelength plate included). The optical layers may be one layer or two or more layer. Especially preferable polarizing plates are; a reflection type polarizing plate or a transflective type polarizing plate in which a reflector or a transflective reflector is further laminated onto a polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy (D-BEF and others manufactured by 3M Co., Ltd.); an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported (PCF350 manufactured by Nitto Denko CORPORATION, Transmax manufactured by Merck Co., Ltd., and others); etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light band, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light band, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a transflective type elliptically polarizing plate, etc. in which the above-mentioned reflection type polarizing plate or a transflective type polarizing plate is combined with above described retardation plate respectively.

Assembling of a liquid crystal display may be carried out according to conventional methods. That is, a liquid crystal display is generally manufactured by suitably assembling several parts such as a liquid crystal cell, optical films and, if necessary, lighting system, and by incorporating driving circuit. In the present invention, except that an elliptically polarizing plate by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned elliptically polarizing plate has been located at one side or both sides of the liquid crystal cell, and with which a backlight or a reflector is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic emitting layer and a metal electrode are laminated on a transparent substrate in an order configuring an illuminant (organic electro luminescence illuminant). Here, an organic emitting layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic emitting layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic emitting layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic emitting layer is formed by a very thin film about 10 nm in thickness. For this reason, light is transmitted nearly completely through organic emitting layer as through transparent electrode. Consequently, since the light that enters, when light is not emitted, as incident light from a surface of a transparent substrate and is transmitted through a transparent electrode and an organic emitting layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic emitting layer that emits light by impression of voltage, and at the same time equipped with a metal electrode on a back side of organic emitting layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to $\pi/4$, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

Hereinafter, detailed descriptions for embodiments of the present invention will be given with reference to Examples and Comparative Examples, but these Examples and Comparative Examples do not limit the present invention. The characteristics of optical films (after stretched) etc. of each Example were measured by following methods.

<Photoelastic Coefficient>

Using Ellipsomter manufactured by Jasco Corporation (M220), a stress refractive index was measured when a stress of $1 \times 10^{-6}$ to $30 \times 10^{-6}$ was applied to an optical film with a width of 2 cm at room temperature (23° C.). The obtained measured values were plotted and a photoelastic coefficient c: (m$^2$/N) was calculated from stress birefringence $\Delta n = c\delta$. Where, $\delta$ represents stress (N/m$^2$).

<Measurement of Refractive Index: Nz Coefficient and Retardation>

In measurement of refractive index of optical films, each of main refractive indexes nx, ny, and nz in a film plane direction and in a thickness direction, respectively, were measured as a value for $\gamma=590$ nm using an automatic birefringence measuring equipment (manufactured by Oji Scientific Instruments, automatic birefringence meter). Nz=(nx−nz)/(nx−ny) was calculated from obtained refractive index values. Moreover, a front retardation (Re)=(nx−ny)×d, and a retardation in a thickness direction=(nx−nz)×d were calculated from refractive index values and an optical film thickness (d:nm).

<Glass Transition Temperature: Tg>

It was measured with a heating rate of 10° C./minute under nitrogen gas current of 20 ml/minute using a DSC 5500 manufactured by SEIKO Instruments Inc.

<Weight Average Molecular Weight>

A weight average molecular weight of a tetrahydrofuran soluble portion was calculated with HLC-8120 GPC system manufactured by TOSOH CORPORATION using a gel permeation chromatography (GPC) method (by polystyrene standard).

<Tilting Angle>

In the optical film (3), an tilting angle that was made by an average optical axis of an optical material having tilted alignment and a direction of normal line of the optical film (3) were inclined −50° to 50° right and left centering on slow axis in the optical film (3), and thus a retardation was measured with the measuring apparatus. An absolute value of an angle showing a minimum retardation was adopted. Besides, in measurement, a measured angle was set as 0°, when a normal line to a film plane is in agreement with a direction of incidence of a light from a light source of a measuring instrument.

Example 1

(Optical Film (1) Having a Controlled Three Dimensional Refractive Index)

As a polymer film including a polycarbonate resin and a styrene resin, PF film (thickness of 55 μm): a product name, manufactured by Kaneka Corp. was used. The polycarbonate resin includes a polymer originated in 2,2-bis(4-hydroxy phenyl)propane, and 1,1-bis (4-hydroxy phenyl)-3,3,5-trimethyl cyclohexane with a blending ratio of 40:60 (by weight ratio). Moreover, a content ratio of a styrene resin (weight average molecular weight 10,000) in the polymer film was 20% by weight.

Heat-shrinkable films, which are a biaxially stretched polyester film, were adhered on both sides of the polymer film (PF film) through pressure sensitive adhesive layers. Then, the obtained film was held with a simultaneous biaxial stretching machine, and stretched 1.3 times at 145° C. The obtained stretched film was transparent, and had a thickness of 60 μm, a front retardation of 140 nm, a retardation in a thickness direction of 70 nm, and an Nz coefficient of 0.5. Moreover, a photoelastic coefficient gave $5.0 \times 10^{-11}$, and Tg 140° C.

(Optical Film (2) Showing Optically Positive Uniaxial Property)

A norbornene based film with a thickness of 100 μm (manufactured by JSR, Inc., product name Arton) was uniaxially stretched 1.5 times at 170° C. The obtained stretched film had a thickness of 75 μm, a front retardation of 270 nm, a retardation in a thickness direction of 270 nm, and an Nz coefficient of 1.0. In addition, a photoelastic coefficient gave $10.0 \times 10^{-11}$ and a Tg 170° C.

(Optical Film (3) in Which a Material Showing Optically Negative Uniaxial Property is Tilting Aligned)

A film WVSA 12 B manufactured by Fuji Photo Film, Co., Ltd. (thickness: 110 μm) was used. The film is produced by applying a discotic liquid crystal onto a supporting medium, and has a front retardation of 30 nm, a retardation in a thickness direction of 160 nm, and a tilting angle of an average optical axis being tilting aligned of 200.

(Laminated Optical Film and Elliptically Polarizing Plate)

The optical film (1), optical film (2), and optical film (3) were laminated through pressure sensitive adhesive layers (30 μm in thickness, acrylic based pressure sensitive adhesive), and a laminated optical film as shown in FIG. 1 was obtained. Subsequently, a polarizing plate (P) (manufactured by NITTO DENKO Co., Ltd., TEG1465DU) was laminated on the optical film (2) side of the laminated optical film through a pressure sensitive adhesive layer (30 μm in thickness, acrylic based pressure sensitive adhesive), and an elliptically polarizing plate as shown in FIG. 4 was obtained.

Example 2

The optical film (1), the optical film (2), the optical film (3), and a polarizing plate (P) used in Example 1 were laminated through pressure sensitive adhesive layers (30 μm in thickness, acrylic based pressure sensitive adhesive) in an order of the optical film (1)/the optical film (3)/the optical film (2)/the polarizing plate (P) as shown in FIG. 5, and an elliptically polarizing plate was obtained.

Example 3

The optical film (1), the optical film (2), the optical film (3), and the polarizing plate (P) used in Example 1 were laminated through pressure sensitive adhesive layers (30 μm in thickness, acrylic based pressure sensitive adhesive) in an order of the optical film (1)/the optical film (2)/the optical film (3)/the polarizing plate (P) as shown in FIG. 6, and an elliptically polarizing plate was obtained.

Comparative Example 1

(Optical film (2) showing optically positive uniaxial property)

A norbornene based film with a thickness of 100 μm (manufactured by JSR, Inc. product name Arton) was uniaxially stretched 1.3 times at 170° C. The obtained stretched film had a thickness of 80 μm, a front retardation of 140 nm, a retardation in a thickness direction of 140 nm, and an Nz coefficient of 1.0. This film obtained was named as optical film (2-2).

(Elliptically Polarizing Plate)

Figure 7:
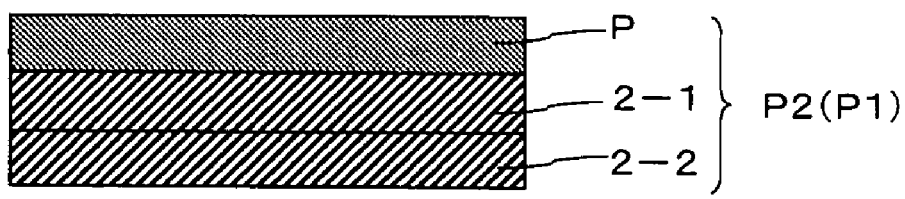
FIG. 7 is one embodiment of a sectional view of an elliptically polarizing plate of a comparative Example.

The optical film (2) obtained in Example 1 was used as an optical film (2-1). The optical film (2-2), the optical film (2-1), and the polarizing plate (P) used in Example 1 were laminated through pressure sensitive adhesive layers (30 μm in thickness, acrylic based pressure sensitive adhesive) in an order of the optical film (2-2)/the optical film (2-1)/the polarizing plate (P) as shown in FIG. 7, and an elliptically polarizing plate was obtained.

Comparative Example 2

(Polymer Film)

As a polymer film consisting of a polycarbonate resin, R film: product name by Kaneka Corp. (70 μm in thickness) was used.

(Optical Film (1'))

Heat-shrinkable films, which are a biaxially stretched polyester film, were adhered on both sides of the polymer film (R film) through pressure sensitive adhesive layers. Then, the obtained film was held with a simultaneous biaxial stretching machine, and stretched 1.1 times at 160° C. The obtained stretched film was transparent and had a thickness of 80 μm, a front retardation of 140 nm, a retardation in a thickness direction of 70 nm, and an Nz coefficient of 0.5. In addition, a photoelastic coefficient gave $12.0 \times 10^{-11}$ and a Tg 155° C.

(Elliptically Polarizing Plate)

Figure 8:
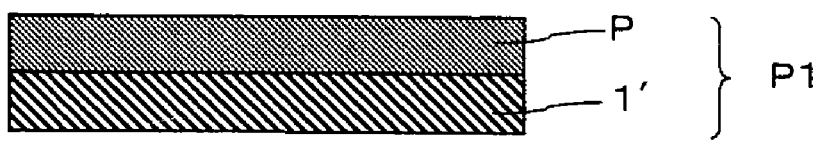
FIG. 8 is one embodiment of a sectional view of an elliptically polarizing plate of a comparative Example.

The optical film (1') and the polarizing plate (P) were laminated through a pressure sensitive adhesive layer (30 μm in thickness as shown in FIG. 8, acrylic based pressure sensitive adhesive) in an order of the optical film (1')/the polarizing plate (P), and an elliptically polarizing plate was obtained.

(Evaluation)

The elliptically polarizing plate produced in Examples and Comparative Examples were mounted as an elliptically polarizing plate (P1) on a backlight side of a reflective transflective type TFT-TN type liquid crystal display of FIG. 9. On the other hand, the elliptically polarizing plate produced in Comparative Example 1 was mounted as an elliptically polarizing plate (P2) on a viewing side. Each of the elliptically polarizing plate (P1) and the elliptically polarizing plate (P2) was mounted so that a polarizing plate side might be in a lamination position most distant from the liquid crystal cell (L) side. Following evaluation was performed about the liquid crystal display. Table 1 shows the results.

<Viewing Angle>

A white image and black image were displayed on the liquid crystal display, and a Y-value, an x-value, and a y-value in XYZ colorimetric system at viewing angles of 0 to 70° in front and in four (upward, downward, right-hand and left-hand) directions were measured using EZcontrast 160D manufactured by ELDIM.

An angle when a value of a contrast at that time (Y-value (white image))/(Y-value (black image)) gave a value of 10 or more was defined as a viewing angle.

Moreover, in a white image, an amount of chromaticity variation of a chromaticity $(x_{40}, y_{40})$ in a state tilted 40° in four (upward, downward, right-hand and left-hand) directions, respectively, to a chromaticity $(x_0, y_0)$ in a front of a screen was compared. The amount of chromaticity variation was calculated by a following equation. Table 1 shows the results. Amount of chromaticity variation= $\sqrt{\{(x_{40}-x_0)^2+(y_{40}-y_0)^2\}}$.

<Durability>

The liquid crystal display was introduced in following conditions.

Condition (1): 85° C.×480 hours
Condition (2): 60° C., 90% RH×480 hours
Condition (3): a heat shock of −30 to 85° C., 30 minutes each×200 times In-plane unevenness with time of a display image in each of the conditions was evaluated according to following criteria based on variations of contrast.

Value of variation of contrast=absolute value of [{(value with time−initial value)/initial value}×100(%)]

◯: Variation of contrast ≦20%
x: Variation of contrast >20%

TABLE 1

| | | Example 1 | | Example 2 | | Example 3 | | Comparative Example 1 | | Comparative Example 2 | |
|---|---|---|---|---|---|---|---|---|---|---|---|
| | | Viewing angle (°) | Amount of chromaticity variation (−) | Viewing angle (°) | Amount of chromaticity variation (−) | Viewing angle (°) | Amount of chromaticity variation (−) | Viewing angle (°) | Amount of chromaticity variation (−) | Viewing angle (°) | Amount of chromaticity variation (−) |
| Viewing angle (Viewed in inclined direction) | Upward | 28 | 0.28 | 21 | 0.29 | 20 | 0.29 | 13 | 0.35 | 20 | 0.30 |
| | Downward | 30 | 0.26 | 22 | 0.29 | 22 | 0.29 | 15 | 0.33 | 22 | 0.29 |
| | Left-hand | 27 | 0.28 | 21 | 0.29 | 20 | 0.30 | 14 | 0.30 | 20 | 0.30 |
| | Right-hand | 27 | 0.28 | 20 | 0.29 | 21 | 0.29 | 14 | 0.30 | 20 | 0.30 |
| Durability | | | | | | | | | | | |
| Condition (1) | Initial | ◯ | | ◯ | | ◯ | | ◯ | | ◯ | |
| | 120 hours | ◯ | | ◯ | | ◯ | | ◯ | | ◯ | |
| | 240 hours | ◯ | | ◯ | | ◯ | | ◯ | | X | |
| | 480 hours | ◯ | | ◯ | | ◯ | | ◯ | | X | |
| Condition (2) | Initial | ◯ | | ◯ | | ◯ | | ◯ | | ◯ | |
| | 120 hours | ◯ | | ◯ | | ◯ | | ◯ | | ◯ | |
| | 240 hours | ◯ | | ◯ | | ◯ | | ◯ | | ◯ | |
| | 480 hours | ◯ | | ◯ | | ◯ | | ◯ | | X | |
| Condition (3) | Initial | ◯ | | ◯ | | ◯ | | ◯ | | ◯ | |
| | 50 hours | ◯ | | ◯ | | ◯ | | ◯ | | ◯ | |
| | 100 hours | ◯ | | ◯ | | ◯ | | ◯ | | ◯ | |
| | 150 hours | ◯ | | ◯ | | ◯ | | ◯ | | X | |
| | 200 hours | ◯ | | ◯ | | ◯ | | ◯ | | X | |

What is claimed is:

1. A laminated optical film comprising:

an optical film (1) obtained by stretching a polymer film comprising a polycarbonate resin and a styrene resin, wherein a photoelastic coefficient is $2.0 \times 10^{-11}$ to $6.0 \times 10^{-11}$ m$^2$/N, and a three dimensional refractive index is controlled so that an Nz coefficient expressed with Nz=$(nx_1-nz_1)/(nx_1-ny_1)$ may satisfy a relationship of Nz≦0.9, and a front retardation (Re)=$(nx_1-ny_1) \times d_1$ may satisfy a relationship of Re≧80 nm, when a direction where a refractive index in a film plane gives a maximum is defined as X-axis, a direction perpendicular to the X-axis as Y-axis, a thickness direction of the film as Z-axis, and when refractive indexes in each axial direction are defined as $nx_1$, $ny_1$, and $nz_1$, respectively, and a thickness of the film as $d_1$ (nm);

an optical film (2) showing optically positive uniaxial property that satisfies a relationship of $nx_2>ny_2 \cong nz_2$, when a direction where a refractive index in a film plane gives a maximum is defined as X-axis, a direction perpendicular to X-axis as Y-axis, a thickness direction of the film as Z-axis, and when refractive indexes in each axial direction are defined as $nx_2$, $ny_2$, and $nz_2$, respectively; and an optical film (3) formed of a material showing optically negative uniaxial property, and the material being tilting aligned.

2. The laminated optical film according to claim 1, wherein a weight average molecular weight of the styrene resin as a material of the optical film (1) is 20,000 or less.

3. The laminated optical film according to claim 1, wherein a glass transition temperature of the optical film (1) is in a range of 110 to 180° C.

4. The laminated optical film according to claim 1, wherein the optical film (2) is an optical film obtained by stretching a polymer film comprising a norbornene polymer.

5. The laminated optical film according to claim 1, wherein the optical film (2) is an optical film obtained by stretching a polymer film comprising a polycarbonate resin and a styrene resin, the optical film having a photoelastic coefficient of $0.5 \times 10^{-11}$ to $6.0 \times 10^{-11}$ m$^2$/N.

6. The laminated optical film according to claim 1, wherein the material showing optically negative uniaxial property forming the optical film (3) is a discotic liquid crystal compound.

7. The laminated optical film according to claim 1, wherein the material showing optically negative uniaxial property forming the optical film (3) is tilting aligned so that an average optical axis and a normal line of the optical film (3) may make tilting angle in a range of 5 to 50°.

8. The laminated optical film according to claim 1, wherein the optical film (1) having a controlled three dimensional refractive index is disposed between the optical film (2) showing optically positive uniaxial property, and the Optical film (3) in which a material showing optically negative uniaxial property is tilting aligned.

9. An elliptically polarizing plate comprising: a laminated optical film according to claim 1 and a polarizing plate.

10. The elliptically polarizing plate comprising: a laminated optical film according to claim 1 and a polarizing plate, wherein the polarizing plate is laminated on a side of the optical film (2) of the laminated optical film.

11. An image viewing display comprising, the laminated optical film according to claim 1.

12. The image viewing display comprising, the laminated optical film according to claim 1, wherein the laminated optical film is mounted in a liquid crystal display in TN mode, OCB, or homogeneous mode.

13. An image viewing display comprising, the elliptically polarizing plate according to claim 9.

14. The image viewing display comprising, the elliptically polarizing plate according to claim 9, wherein the elliptically polarizing plate is mounted in a liquid crystal display in TN mode, OCB, or homogeneous mode.

* * * * *